Sept. 2, 1958 E. E. MEUSY 2,850,031
ELECTROMAGNETIC CONTROL DEVICE
Filed March 27, 1953 4 Sheets-Sheet 1
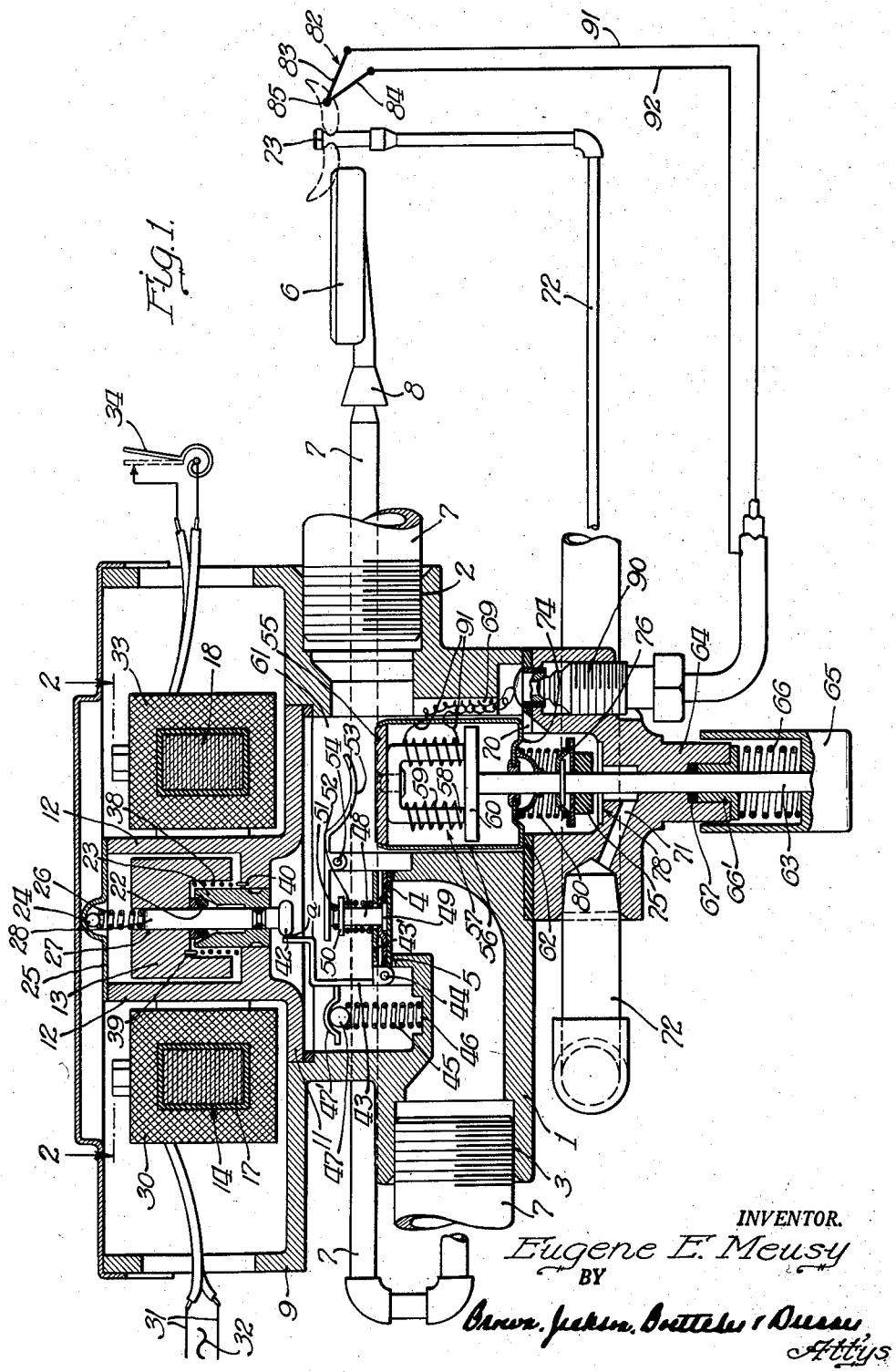
INVENTOR.
Eugene E. Meusy
BY
Brown, Jackson, Boettcher & Dienner
Attys Sept. 2, 1958  E. E. MEUSY  2,850,031
ELECTROMAGNETIC CONTROL DEVICE
Filed March 27, 1953  4 Sheets-Sheet 2
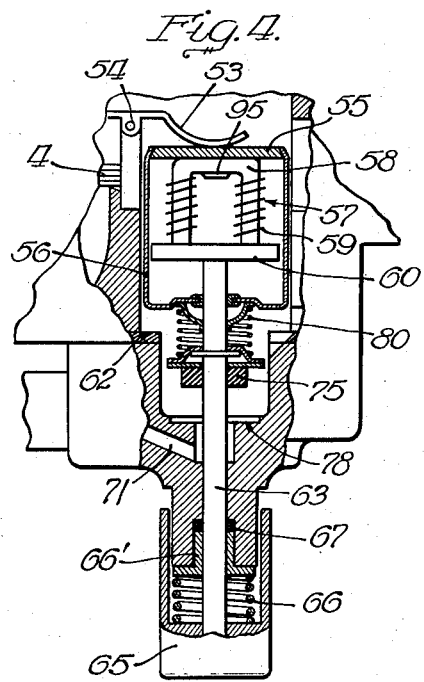
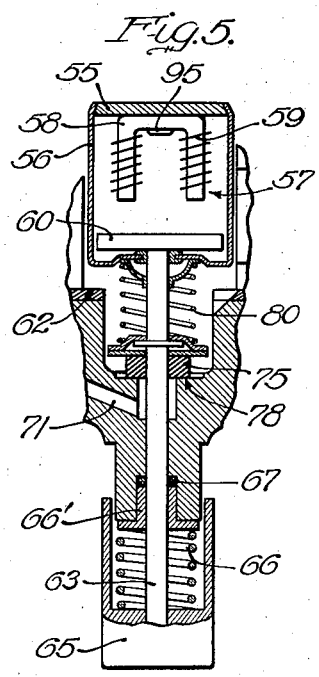
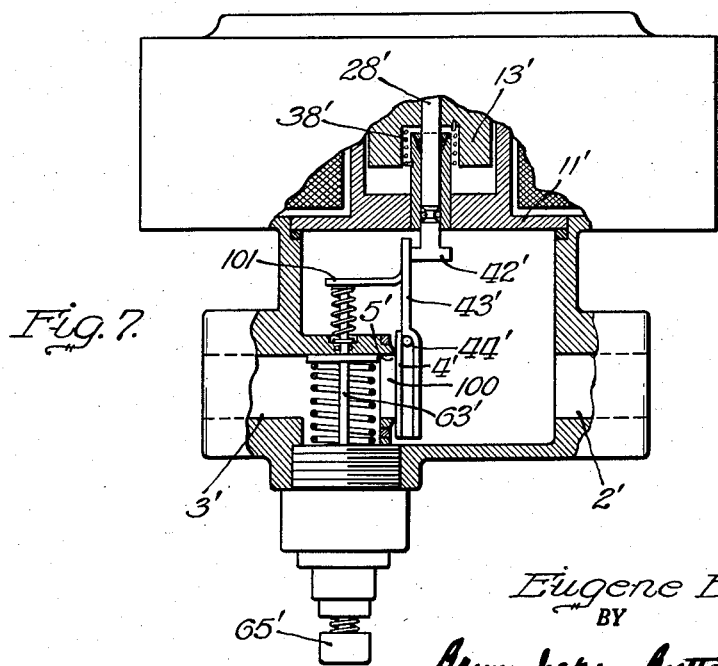
INVENTOR.
Eugene E. Meusy
BY
Attys.

Sept. 2, 1958 E. E. MEUSY 2,850,031
ELECTROMAGNETIC CONTROL DEVICE
Filed March 27, 1953 4 Sheets-Sheet 3

INVENTOR.
Eugene E. Meusy
BY
Brown, Jackson, Boettcher & Dienner
Attys.

Sept. 2, 1958   E. E. MEUSY   2,850,031
ELECTROMAGNETIC CONTROL DEVICE
Filed March 27, 1953   4 Sheets-Sheet 4
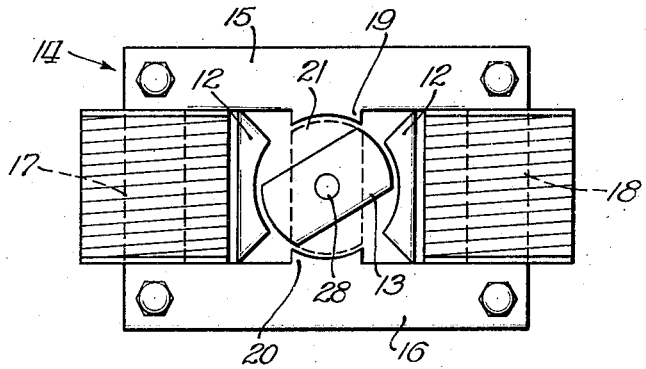
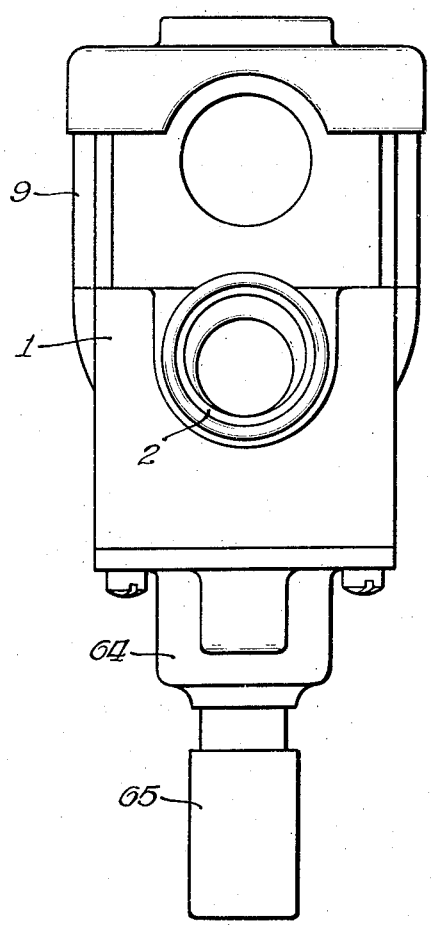
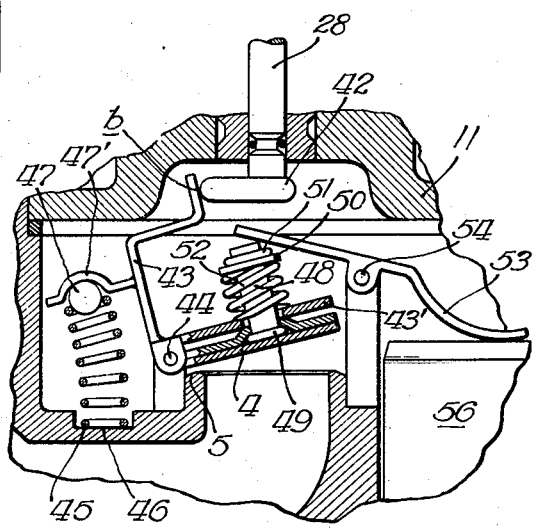
INVENTOR.
Eugene E. Meusy
BY
Attys.

ically to those of the type which include an electro-magnetic operator and have utility in the operation of valves, or the like, for controlling the flow of fluids, for example, the flow of fluid fuel for fluid fuel burning apparatus responsive to changes in temperature or other condition.

2,850,031

ELECTROMAGNETIC CONTROL DEVICE

Eugene E. Meusy, Milwaukee, Wis., assignor to Baso Inc., Milwaukee, Wis., a corporation of Wisconsin Application March 27, 1953, Serial No. 345,010

19 Claims. (Cl. 137—66)

This invention relates to control devices, and more particularly to those of the type which include an electromagnetic operator and have utility in the operation of valves, or the like, for controlling the flow of fluids, for example, the flow of fluid fuel for fluid fuel burning apparatus responsive to changes in temperature or other condition.

While I have shown and shall describe the invention as applied to an electromagnetic operator, in general, of the type illustrated and described in the copending application of Eugene E. Meusy, Serial No. 317,281, filed October 28, 1952, now Patent No. 2,756,370, July 24, 1956, it is to be understood that the present invention is not, in its broader aspects, limited to the embodiments selected for illustration but may be employed with other forms of electromagnetic operators and for other purposes than the particular purpose which will be described.

One of the main objects of the present invention is to provide an improved form of actuator between the electromagnetic operator and the valve or other controlling member.

Another object is to provide an actuator which will permit the opening under control of the valve actuated by the electromagnetic operator to be disposed in the same plane as the rotor shaft of the operator, or coaxially with said shaft, or at substantially right angles to the rotor shaft and in any desired position around the axis of the shaft, or in other positions as suitable or desired.

Another object is to provide an actuator embodying a lever arrangement affording a number and variety of mechanical advantages in the operation of the valve or other controlling member.

Another object is to provide an actuator enabling placing the pivot for the valve disc member in close proximity to the edge of same so that the power required to move the valve disc member, for example, to open position against gas or fluid pressure tending to seal the same is reduced.

Another object is to provide an actuator embodying an actuator cam and valve disc lever wherein the cam may be so shaped that it pushes against the lever at a contact point giving a greater initial force, for example, to open the valve disc against gas or fluid pressure, and wherein after initiating movement and upon opening of the valve, when less power is required to move the valve to open position, the cam contact point is positioned to reduce the mechanical advantage and impart faster and increased movement of the valve disc to fully open position.

Another object is to provide in combination with apparatus of the aforementioned character for controlling flow of fluid fuel to a main burner, a safety shut-off comprising electromagnetic means powered by its own internal source of electric energy, such as that provided by a single thermocouple, or by a thermopile, subject to the heat of a pilot burner flame, and which is operable to shut off the flow of fluid fuel to the main burner, for example, upon extinguishment of the pilot burner flame.

Another object is to provide a safety shut-off which operates to close the valve disc under control of the electromagnetic operator to provide the safety shut-off of the flow of fuel to the main burner.

Another object is to provide a safety shut-off of the aforementioned character which also operates to shut off the flow of fuel to the pilot burner upon extinguishment of the pilot burner flame thus providing 100% safety shut-off upon extinguishment of the pilot burner flame.

Another object is to provide a safety shut-off of the aforementioned character having cocking or reset means for cocking or resetting the same and wherein if the power or circuit for the electromagnetic operator is not calling for heat and the main valve disc is closed the cocking or resetting operation will hold the main valve disc closed to perform flow interruption until the electromagnet for the safety shut-off is energized, for example, by the heat of the pilot burner flame on the thermoelectric generator and the cocking or resetting means is released.

Another object is to provide a safety shut-off of the aforementioned character wherein if the power or circuit for the electromagnetic operator is calling for heat and the main valve disc is open, the cocking or resetting operation will close the main valve disc to perform a flow interrupting function until the electromagnet for the safety shut-off is energized and the cocking or reset means is released. This and the feature to which the preceding object is directed are advantageous since these aspects of the invention utilize the valve disc under control of the electromagnetic operator to assure interruption of the flow of fuel to the main burner until the cocking or resetting of the safety shut-off is completed.

Another object is to provide a device of the character set forth wherein the safety shut-off includes a power unit in the form of an electromagnet and wherein there is means restrained from operation when the electromagnet and an operatively associated armature are held in attracted relation and in which the aforementioned means is operatively associated with the main valve disc under control of the electromagnetic operator and with a pilot valve disc for closing the pilot valve disc and holding closed or closing the main valve disc upon deenergization of the electromagnet and until the electromagnet is reenergized and the safety shut-off is cocked or reset.

Another object is to provide in combination with the other features of a device of the character set forth manual operating means coacting with the safety shut-off to permit manually operating, for example, the armature of the electromagnetic operator with accompanying movement of the valve or the like under control of said electromagnetic operator to flow permitting position (providing the safety shut-off is energized) upon failure of the supply of power or electric energy and for maintaining the armature and valve in the positions to which they are thus operated with means for returning the armature and valve to automatic or power control upon resumption of power or electric energy.

Another object of the invention is to provide an improved operating connection between the electromagnetic operator, main valve, and safety shut-off, whereby movement of the operator (whether by energization thereof or manually) affords opening of the main valve only if the safety shut-off is in operating position.

Another object is to provide operating connections of the aforementioned character wherein the safety shut-off when in deenergized or resetting position holds the main valve closed independently of the position of its electromagnetic or manual operators.

Another object is to provide, in an electromagnetically operated device having means for operating the device manually in the event of power failure, means for frustrating such manual operation so long as power is being supplied.

Another object is to provide a device in which (1) the electromagnetic operator is inherently of a character to afford greater force at the beginning of the stroke, and (2) a cam actuator and coacting lever are of a character to give mechanical advantage which is advantageous in opening the valve and more particularly a device wherein these features (1) and (2) are matched with respect to each other so as to combine and cooperate to afford the desired characteristics, and wherein it is a relatively easy matter to match the characteristics of the operator and valve lever system in various types and sizes of valves by the simple expedient of properly shaping the cam surface of the cam actuator.

Further objects and advantages and numerous adaptations of the invention will appear from the following detailed description taken in connection with the accompanying drawings showing certain embodiments of the invention, it being understood that the invention is limited only within the scope of the appended claims and not to the particular embodiments selected for illustration.

In the drawings:

Figure 1 is an axial sectional view of one form of device embodying the present invention showing more or less diagrammatically the same applied for controlling the flow of fuel to a main burner and for safety shut-off of the flow of fuel to both the main burner and a pilot burner; also including a secondary winding for the electromagnetic operator with schematically illustrated thermostatic means for controlling the secondary circuit, and with the main valve member in closed position and the pilot valve member in flow permitting position;

Figure 2 is a fragmentary plan view taken in general on the line 2—2 of Figure 1 and showing more or less schematically the pole faces on the magnetic core of the electromagnetic operator and the magnetic armature or rotor;

Figure 3 is an end view of the device looking toward the right-hand end as it is shown in Figure 1;

Figure 4 is a fragmentary sectional view showing the safety shut-off mechanism in cocking or resetting position;

Figure 5 is a fragmentary sectional view similar to Figure 4, and showing the safety shut-off mechanism in released or deenergized position;

Figure 6 is a fragmentary sectional and more or less schematic view showing the main valve disc actuated to open position by the electromagnetic operator;

Figure 7 is a fragmentary detail section showing another embodiment in which the fluid outlet under control of the main valve disc is disposed at substantially right angles to the axis of the rotor;

Figure 8:
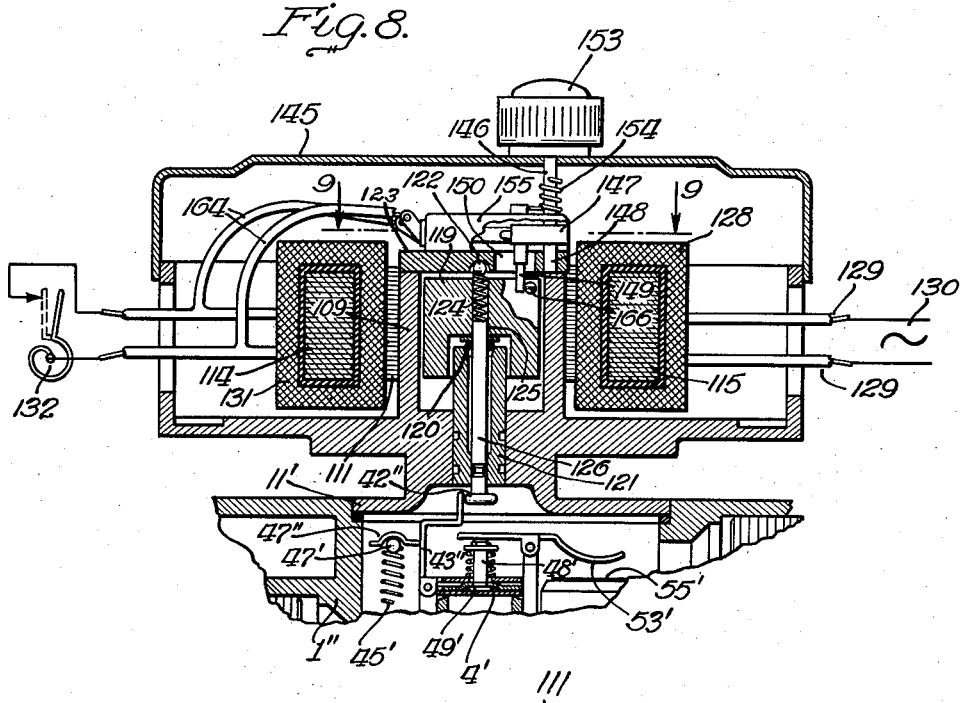
Figure 9:
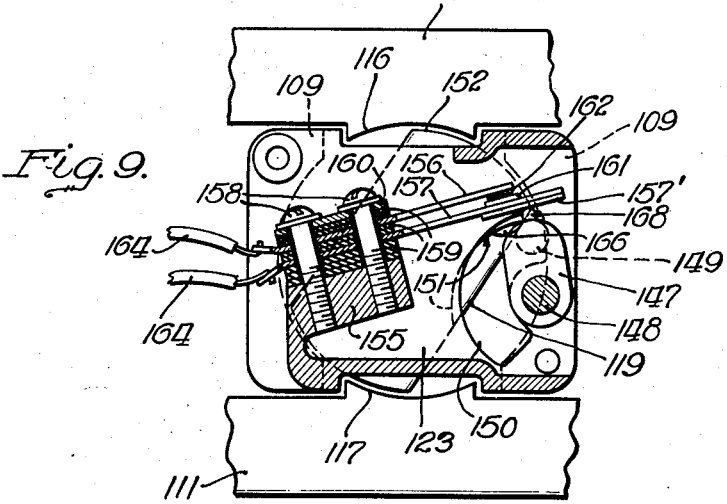

Figure 8 is a fragmentary axial sectional view showing in combination with a device according to the present invention manual operating means for manually operating, for example, the armature of the electromagnetic operator with accompanying movement of the valve or the like under control of said electromagnetic operator to flow permitting position upon failure of the supply of power or electric energy and for maintaining the armature and valve in the positions to which they are thus operated with means for returning the armature and valve to automatic or power control upon resumption of power or electric energy; and Figure 9 is a fragmentary view taken substantially on the line 9—9 of Figure 8 with the armature in the position to which it is turned by the manual operator and the manual operator positioned to maintain the armature in the illustrated position.

Referring to the drawings, the device shown in Figures 1 to 6 inclusive comprises an electromagnetic main valve operator which may, for example, be of the form, in general, illustrated in the aforementioned copending application of Eugene E. Meusy.

The details of the electromagnetic valve operating means may be ascertained more fully by reference to the aforementioned copending application. For purposes of the present application suffice it to state that the form of device illustrated in Figures 1–6 comprises a valve body 1 having a fluid fuel inlet 2 and a main fluid fuel outlet 3. A main valve disc 4 cooperates with a valve seat 5 to control the flow of fluid or gaseous fuel to a main burner 6. Contiguous sections of gaseous fuel supply pipe 7 are connected to the inlet 2 and outlet 3. The section connected to the outlet 3 leads, for example, to the main burner 6 which may be located in the firebox of a heater or fuel burning apparatus.

The delivery of gaseous fuel from the pipe 7 to the main burner 6 is preferably by way of a mixing chamber 8 to which air is admitted through adjustable air inlets (not shown) as well understood in the art.

The valve body 1 has integral therewith an enclosure 9 for the electromagnetic operating means. The valve body 1 has an opening covered by a plate-like cover 11 provided with a pair of integrally formed upstanding arms 12 of configuration best shown in Figure 2 forming a partial enclosure for a rotor or rotary armature 13.

Mounted on the plate-like bottom wall of the enclosure 9 is a power unit comprising a magnetic core 14 of laminated or other suitable form. The particular core or magnetic frame 14 selected for illustration is of generally rectangular configuration comprising a pair of parallel side legs 15 and 16 magnetically connected by parallel end legs 17 and 18. Integrally formed on the side legs 15 and 16 of the core 14 are pole faces 19 and 20 defining between them an air gap 21 in which the magnetic armature or rotor 13 is adapted to be drawn.

The rotor 13 is of magnetic material such as steel and is shown in solid form positioned for turning movement between bearings as illustrated by the bearing at 22 between the bottom of the rotor 13 and the upper end of a sleeve 23 carried by and projecting through the plate-like cover 11 and by a thrust bearing 24. The bearing 24 is carried by or coacts with a bearing plate or cover 25 mounted on the upper ends of the arms 12 and comprises a ball and compression spring 26 trapped in an axial recess in the rotor 13. The rotor 13 is fixed, for example, at 27 to a shaft 28 so that the shaft 28 will turn with turning movement of the rotor.

The thrust bearing comprising the spring 26 and ball 24 keeps the tapered ball bearing 22 under compression. This eliminates any free play between the shaft 28 and bearing tube 23, thereby eliminating noise normally brought about by magnetic flux alternation.

The electromagnetic operator further comprises a primary winding 30 adapted to be connected to a suitable source of electric energy, for example, by conductors 31 to a source of alternating current indicated symbolically at 32. The winding 30 is carried by one of the end legs of the core or magnetic frame 14 and the other end leg carries a secondary winding 33, the circuit of which includes condition responsive means shown as a thermostat 34. It will be understood that when the primary winding is energized and the secondary circuit is open, the magnetic flux created in the core 14 by energization of the primary winding 30 will tend to flow around the core through the end leg 18 in preference to jumping the air gap 21 between the pole faces 19 and 20, whereas when the secondary circuit is closed, induced currents in the secondary winding 33 will divert the magnetic flux across the air gap 21 to cause turning movement of the rotor 13 from the position shown in full lines to the position shown in dotted lines in Figure 2.

A torsion spring 38 is shown coiled about the sleeve 23 with one end fixed at 39 to the rotor 13. The opposite end of the spring 38 is fixed, for example, at 40 to the cover 11. In the illustrated embodiment of the invention, the spring 38 serves, when the electromagnetic operator is deenergized, to bias the shaft 28 to position in which the valve disc 4 assumes closed position as will presently be described.

As shown in Figure 1, the shaft 28 connected to the rotor 13 extends downwardly or inwardly from the sleeve 23 into the interior of the valve body 1 and has a cam actuator 42 fixed on its inner or lower end to turn with the shaft 28. The actuator 42 engages or operatively coacts with the adjacent end of a lever 43. The lever 43 and the main valve disc 4 are independently and coaxially pivoted at 44, for example, to the main valve body 1 and preferably with the pivot 44 positioned in close proximity to the edge of the valve disc 4. A coiled compression spring 45 is interposed between an abutment 46 on the valve body 1 and a ball 47 which coacts with an integral arm or lug 47' on the lever 43.

As best shown in Figure 6, the lever 43 has an arm 43' which is superimposed on the valve disc 4 and is formed with an opening to slidably receive a pin 48 projecting therethrough from the valve disc 4. The pin 48 has, for example, a head fixed to the valve disc 4, said pin extending upwardly from the valve disc and having an abutment ring 51 fixed in a peripheral groove adjacent its upper end. A coiled compression spring 52 surrounds the pin 48 and is interposed between the arm 43' of the lever 43 and a retaining collar 50 which surrounds the pin 48 adjacent the abutment ring 51.

The spring 45 yieldingly biases the lever 43 in a clockwise direction (Figure 1) about its pivot 44, and thereby the valve disc 4, into closed position against its seat 5 and the opposite free end of the lever 43 against the peripheral cam surface of the actuator 42. The juxtaposition of the pivot 44 to the edge of the valve disc 4 reduces the power required to open said valve against fluid pressure which usually tends to seal the valve disc against its seat.

The lever 53 is pivoted intermediate its ends at 54, for example, to the valve body 1 and its opposite end coacts with the end member 55 of a hood or housing 56 which encloses an electromagnet 57 comprising a magnet frame 58 and a coil 59 wound around the legs thereof. The electromagnet 57 is provided with an armature 60. The hood assembly has reciprocatory movement in a chamber 61 which is in open communication with the inlet 2. Outward (downward as the device is shown in Figure 1) movement of hood 56 is limited by engagement of the adjacent end wall of the hood with an abutment 62.

The armature 60 is carried by a cocking or reset stem 63 which projects axially through a pilot fuel fitting 64 suitably secured to the valve body 1. The stem 63 carries a cocking or reset button 65 at its outer end and a coiled spring 66 is interposed, for example, between the button 65 and a bushing 66'. A resilient or rubber-like O-shaped ring 67 is interposed between the inner end of the bushing 66' and the fitting 64 and is yieldingly compressed by the spring 66 to provide a gas-tight seal for the stem 63.

The interior of the fitting 64 is in open communication, for example, through passages 69 and 70 with the main fuel inlet 2. A pilot fuel outlet 71 opens from the interior of the fitting 64 to a pilot fuel supply pipe 72 which is connected to supply gaseous fuel to a pilot or ignition burner 73 located in juxtaposition to the main burner 6 for igniting the same.

The reset stem 63 has reciprocatory movement through an opening (which is preferably sealed) in the end wall 74 of the hood 56. A pilot valve 75 is connected at 76 to the stem 63 for reciprocatory movement therewith and when the electromagnet 57 is deenergized coacts with a valve seat 78 to shut off the flow of gaseous fuel to the pilot burner 73. A coiled spring 80 is interposed between the pilot valve 75 and the end wall 74 of the hood 56 and is compressed by the inward movement of the pilot valve 75 which accompanies inward movement of the stem 63 in cocking or resetting the device.

The electromagnet 57 is shown powered by a single thermocouple 82 heated, for example, by the flame of the ignition burner 73, although a thermopile or other source of small or, if desired, greater electric energy may be employed. The thermocouple 82 comprises dissimilar thermocouple elements 83 and 84 joined at 85 to form a "hot" junction which is heated by the ignition burner flame. The thermocouple elements are connected in circuit with the coil 59 of the electromagnet 57 by lead conductors 91 and 92 for energization of the coil 59 by the thermocouple 82 when its "hot" junction is heated by the ignition burner flame.

The thermocouple 82 and lead conductors 91 and 92 may be of concentric form, the thermocouple comprising an outer tubular thermocouple member and an inner thermocouple member and the lead conductors comprising an outer tubular lead conductor joined to the outer thermocouple member and an inner lead conductor joined to the inner thermocouple member as disclosed in Oscar J. Leins Patent No. 2,126,564, patented August 9, 1938. In such case, the concentric lead conductors may be detachably connected in circuit with the coil of the electromagnet 20 by a detachable terminal connector means 90 in the wall of the fitting 64 as disclosed in Henry J. Alfery Patent No. 2,276,909, patented March 17, 1942. The circuit connection between the terminal connector means 90 and the coil 59 of the electromagnet has been shown more or less diagrammatically at 91 in the drawings of the present application.

The operation of the embodiment of the invention illustrated in Figures 1-6 is as follows:

Assuming the primary winding 30 to be energized by electric current from the source 32, as it will be under ordinary circumstances, since the device inherently has a very low stand-by power loss, a magnetic flux will be created in the core 14 in a clockwise direction as viewed in Figure 2, the flux as aforementioned flowing through the leg 18 of the core 14 as long as the circuit of the secondary winding 33 remains open. The rotor 13 is angularly disposed on shaft 28 so that in unenergized condition the leading edges of the rotor or armature arms are barely within the air gaps 21 between the pole faces 19 and 20; that is, a very small portion of the rotor 13 is presented to the pole faces 19 and 20 respectively as shown in full lines in Figure 2. It is, of course, understood that the angular disposition of the shaft 28 and hence rotor 13 when unenergized is determined by the bias afforded by the spring 38.

When the circuit of the secondary winding 33 is closed, as for example, by closure of the contacts of the thermostat 34, the magnetic flux of core 14 will no longer flow through the leg 18 thereof, but will be diverted to the pole faces 19 and 20. Since the flux will cross the air gap 21 therein at the point of minimum air gap, and since the minimum air gap occurs at the points where the leading edges of the rotor 13 are presented to the pole pieces, the magnetic flux will be concentrated at these points imparting a counterclockwise (Figure 2) torque to the rotor 13. The inherent tendency of the device is to tend toward a condition of minimum air gap. Hence the rotor 13 will be rotated into the air gap until the rotor arms are in registry with the pole faces 19 and 20, respectively, as shown in dotted lines in Figure 2. Further rotation of the rotor 13 will not occur since such movement would tend to increase the air gap, and movement of the leading edges of the rotor arms beyond the pole faces would set up magnetic forces creating a torque in the opposite direction. The rotor 13 is thereby afforded a magnetic stop limiting its rotation in counterclockwise direction as viewed in Figure 2 to a position where the rotor arms are in registry with the pole faces 19 and 20 of the core 14 as aforedescribed.

The foregoing phenomenon may be further elucidated by reference to the mathematical relationships involved which may be expressed as follows:

$$F = \frac{B^2 A}{72} \text{ lbs.}$$

where F is the force of attraction brought to bear upon the rotor 13 expressed in pounds, B is the magnetic flux density expressed in kilomaxwells per square inch, and A is the area of rotor 13 presented to the pole faces 19 and 20 expressed in square inches. From this relationship it will also be seen that the device described inherently imparts a greater force at the beginning of the stroke than at the end thereof. A (the area of the rotor 13 presented to the pole faces) increases as the rotor approaches registry with the pole faces, however, since B (the flux density per unit area) decreases as A increases, and in the formula B is squared, the net result is that F varies inversely with A. For example, if the rotor area presented to the pole faces is .0508 square inch when the rotor is unenergized and the total area of the rotor arms which may be presented to the pole pieces when in registry therewith is .71 square inch, the force at the beginning of the stroke will be 13.95 times the force exerted at the end of the stroke. This relationship has obvious advantage in that the rotor torque varies in the same manner as the forces required to operate a mechanism requiring greater force to initiate movement thereof than to maintain or continue such movement, as for example, a valve member such as valve member 4 which must be moved against fluid pressure initially.

Assuming that the electromagnet 57, armature 60, hood assembly and pilot valve 75 are in their energized positions with the pilot valve 75 open, the ignition burner 73 ignited and the thermocouple 83 heated by the flame of the ignition burner, the turning movement of the shaft 23 accomplished by movement of the rotor 13 from its full line position to its dotted line position as shown in Figure 2 turns the cam actuator 42 therewith. In the aforementioned turning movement of the actuator 42, the cam surface thereof pushes against the coacting end of lever 43 and swings lever 43 counterclockwise as viewed in Figure 1 about its pivot 44. Such movement of lever 43 is transmitted through spring 52 and retainer 50 to pin 48 to pivot the valve disc 4 about point 44 thereby opening the valve to a position shown in Figure 6. Gaseous fuel now flows through outlet 3 to the main burner 6 where it is ignited by the ignition burner 73. The pivot 44 for the lever 43 is preferably positioned in close proximity to the edge of the valve disc 4 to reduce the power required to open the valve disc against fluid pressure. The cam surface of the actuator 42 is preferably so shaped that in the initial aforementioned turning movement of the actuator 42 the cam surface pushes against the coacting end of the lever 43 at contact point a (Figure 1) at which the cam radius is at a minimum giving a greater initial force for opening the valve disc 4 and thereafter the cam surface pushes against the lever 43 at contact point b (Figure 6) of greater radius to reduce the mechanical advantage and impart faster and increased movement of the valve disc 4 to fully opened position.

When the circuit of secondary winding 33 is opened, as for example, by opening of the contacts of the thermostat 34, the magnetic flux of the core 14 is no longer diverted across the air gap 21 but flows through the leg 18 of the core and the rotor 13 returns to the position shown in full lines in Figure 2 under the bias of the spring 38. This is accompanied by return of lever 43 to the position shown in Figure 1 by the spring 45 thus closing valve disc 4 against its seat 5 to shut off the flow of fuel to the main burner and maintaining the free end of lever 43 in contact or operative coaction with the cam actuator 42.

Upon extinguishment of the ignition burner flame, the electromagnet 57 is deenergized and the electromagnet and armature 60 are freed of each other. The spring 66 then acts to move the pilot valve 75 to closed position against its seat 78 to shut off the flow of fuel to ignition burner 73 and spring 80 acting through its engagement with the adjacent end wall of hood 56 moves the hood assembly and the electromagnet carried by the end wall 55 at 95 to the deenergized position as shown in Figure 5. In this movement of the hood assembly to the position shown in Figure 5, the end wall 55 thereof engages the adjacent arm of lever 53 swinging this lever 53 counterclockwise as viewed in Figure 1 about its pivot 54 to close and/or hold closed the main valve disc 4 by engagement with the end of the pin 48, thus providing 100% safety shut-off upon extinguishment of the ignition burner flame.

When the valve disc 4 is being held closed by the deenergized safety shut-off assembly acting through the lever 53, it is impossible for the electromagnetic operator, acting through the lever 43, to move said disc to open position and said operator is thus effectively overcalled by the deenergized safety shut-off assembly in holding the valve disc 4 closed. The closing force of the spring 80 acting through the hood 56 and lever 53 is greater than the opening force which can be transmitted through the spring 52. Hence, if the lever 43 is swung counterclockwise by the electromagnetic operator while the valve disc 4 is held closed by the safety shut-off assembly, the arm 43' merely swings upwardly along the pin 48 and compresses the spring 52 without imparting any movement to said pin or to the valve disc 4. The ability of the lever 43 to thus pivot relative to the valve 4 permits the armature 13 of the electromagnetic operator to rotate under the control of the thermostat 34, irrespective of whether or not the valve disc 4 is being held closed. This prevents overheating of the operator which would otherwise result if the armature were prevented from moving and the thermostat called for heat.

When it is desired to ignite or reignite the main burner 6 with the safety shut-off parts positioned as shown in Figure 5, the reset button 65 is engaged with the hand or fingers and pressed inwardly. The inward movement of the reset button 65 is against the bias of springs 66 and 80 and the accompanying initial inward movement of stem 63 opens the pilot valve 75 for flow of fuel to the ignition burner 73 which may then be ignited, for example, by a match or a lighted taper or by an electric igniter or otherwise as desired. Continued inward movement of stem 63 sets the armature into attracted relation with respect to the electromagnet 57, the hood 56, meanwhile, continuing to hold the lever 53 and valve 4 in closed position. While the valve 4 is thus being held closed, the lever 43 can pivot in response to actuation by the electromagnetic operator, without imparting any motion to the valve 4.

As soon as the heat of the ignition burner flame on the "hot" junction 85 of the thermocouple 82 has energized the coil 59 of the electromagnet 57 sufficiently, the electromagnet holds the armature 60 attracted to the poles of the magnet frame. The reset button 65 may then be released and when the reset button is released after energization of the electromagnet, the spring 66 withdraws the hood assembly, electromagnet, armature and pilot valve outwardly as a unit from the cocking or resetting position shown in Figure 4 to the energized position shown in Figure 1 with the hood seated against the abutment 62 and the pilot valve 75 still in open position for continued flow of gaseous fuel to the ignition burner 73. Main valve disc 4 is then under control of the electromagnetic operator which with the spring 45 produces opening and closing of the main valve responsive to changes in temperature to which the thermostat 34 is subjected.

Figure 7 shows the valve opening 100 at right angles to the axis of the rotor shaft 28' instead of coaxial therewith as shown in Figure 1. The valve disc lever 43' is pivoted at 44' and carries the main valve disc 4' for swinging movement to closed position against valve seat 5' and to open position away from the valve seat. The reset or cocking button is indicated at 65' and reset stem 63' cooperates with an arm 101 integral with lever 43' for closing and/or holding closed the main valve disc 4' during the cocking operation as previously described. The other parts of this embodiment of the invention which are similar to the parts of the preceding embodiment are designated by primed reference numerals corresponding with the reference numerals used in connection with the preceding embodiment of the invention.

In the embodiment of the invention illustrated in Figures 8 and 9, the core or magnetic frame 111 is of the form previously described, the end legs being indicated at 114 and 115. The rotor 119 is of magnetic material such as steel and is shown in solid form positioned for turning movement between bearings as illustrated by the bearing at 120 between the bottom of the rotor 119 and the upper end of a sleeve 121 and by a thrust bearing 122. The thrust bearing 122 is carried by a bearing plate 123 mounted on the upper ends of the arms 109 and comprises a ball and compression spring 124 trapped in an axial recess in the rotor 119. The rotor 119 is fixed, for example, at 125 to a shaft 126 so that the shaft 126 will turn with turning movement of the rotor.

The thrust bearing comprising the spring 124 and ball 122 keeps the tapered ball bearing 120 under compression. This eliminates any free play between the shaft 126 and bearing tube 121, thereby eliminating noise normally brought about by magnetic flux alternation.

The electromagnetic operator further comprises a primary winding 128 adapted to be connected to a suitable source of electric energy, for example, by conductors 129 to a source of alternating current indicated symbolically at 130. The winding 128 is carried on one of the end legs of the core or magnetic frame and the other end leg carries a secondary winding 131, the circuit of which includes condition responsive means such as a thermostat 132. As in the previous embodiment of the invention when the primary winding is energized and the secondary circuit is open the magnetic flux created in the core 111 by energization of the primary winding 128 will tend to flow around the core through the end leg 114 in preference to jumping the air gap between the pole faces between which the rotor 119 is mounted for turning movement. When the secondary circuit is closed induced currents in the secondary winding 131 will divert the magnetic flux across the air gap to cause turning movement of the rotor 119 in the manner previously described.

As shown in Figure 8, the shaft 126 connected to the rotor 119 extends downwardly into the interior of the valve body 1" and is connected to a cam actuator 42" fixed on its inner or lower end to turn with the shaft 126. The actuator 42" engages or operatively coacts with the adjacent end of a lever 43" which corresponds with the lever 43 of the embodiment of the invention illustrated in Figures 1-6 and operates in the same manner and with the advantages previously described. The valve 4', pin 49', lever 53', end member 55', and electromagnet 57' are similar to the corresponding parts of the embodiment of the invention shown in Figures 1-6 and operate similarly thereto and it is to be understood that the remainder of the safety shut-off for the flow of fluid by the actuation of the valve 4' and for the auxiliary or pilot flow of fuel (not shown) are similar to the corresponding mechanism as disclosed in Figures 1-6. All of this disclosure has not therefore been repeated in Figure 8.

The control device of Figures 8 and 9 is provided with a cover 145 preferably of non-magnetic material and suitable form and extending for turning movement through an opening in this cover is the shaft 146 of the manual operator. The inner end of the shaft 146 is non-rotatably connected to a crank 147 which has a pivot pin 148 which turns in a bearing opening in the bearing plate 123. The crank 147 carries an off-center pin 149 which extends downwardly through an opening 150 in the bearing plate 123 for coaction with the arcuate sidewall surface of an arcuate recess 151 in the adjacent side of the rotor 119. The ends of the rotor 119 are arcuately formed at 152 as are the pole faces 116 and 117 as shown in Figure 9. The outer end of the shaft 146 has a handle 153 non-rotatably secured thereto so that by grasping the handle the shaft 146 may be manually turned.

The crank 147 and shaft 146 are biased to deenergized position by a coiled spring 154 coiled about the shaft 146 and anchored to the shaft at one end and at its opposite end, for example, to a contact spring support 155 mounted on the bearing plate 123. The support 155 carries a pair of spring contact leaves 156 and 157 secured to the support 155, for example, by screws 158 with insulating strips 159 interposed between the spring 157 and support 155, between springs 156 and 157 and between spring 156 and attachment plate 160. The spring 157 carries a contact 161 which is biased out of contact with a contact 162 carried by spring 156 when the manual operator is released. The springs 157 and 156 are connected to the secondary circuit in shunt with the terminals of thermostat 132 by conductors 164 so that when the contacts 161 and 162 are in contact the circuit for the secondary winding 131 will be closed regardless of the condition of the thermostat.

For the purpose of retaining the rotor 119 and valve member 4' in the positions to which they are moved by the manual operator which positions are intermediate positions short of the positions to which they are moved by the electromagnetic operator as shown by the position of the rotor 119 in Figure 9, the recess 151 of the rotor 119 is provided with a rounded projection 166 which may take the form of the head of a screw threaded into the rotor, said projection being positioned for coaction with the off-center pin 149 as shown particularly in Figure 9.

For the purpose of closing the contact 161 into contact with contact 162 by turning movement of the manual operator, the crank 147 carries an insulating nib 168 which engages spring leaf 157 and presses contact 161 into contact with contact 162 as the crank 147 is turned to the position shown in Figure 9. This closes the circuit for the secondary winding 131 regardless of the condition of the thermostat. The spring leaf 157 is provided with an integral non-resilient reinforcing member 157' to prevent deformation of the portions of said leaf outwardly of the contact 161. Lost motion which might otherwise result from such deformation is thereby prevented.

The operation of the embodiment of the invention illustrated fragmentarily in Figures 8 and 9 is as follows:

Assuming that the primary winding 128 is energized by electric energy from the source 130, magnetic flux will be created in the core 111 and will flow through the leg 114 as long as the circuit of secondary winding 131 remains open. The rotor 119 is disposed in deenergized position at this time with the valve 4', for example, in closed position. This position of the rotor may be determined by the bias afforded by a spring similar to the spring 38 of Figure 1, this spring being not shown in Figure 8 to simplify the illustration.

When the circuit of secondary winding 131 is closed as, for example, by closure of the contacts of the thermostat 132, the magnetic flux of core 111 will no longer flow through the leg 114 thereof but will be diverted to the pole faces 116 and 117. Since the flux will cross the air gap at the point of minimum air gap and since the minimum air gap occurs at the points where the leading edges of the rotor 119 are presented to the pole faces, the magnetic flux will be concentrated at these points and will turn the rotor from its deenergized position to the position shown in dotted lines in Figure 2 of the embodiment of the invention shown in Figures 1-6.

In the event of failure of electric energy or power from the source 130, the rotor 119 remains in or returns to the position shown in full lines in Figure 2 of the embodiment of the invention shown in Figures 1-6 under the bias, for example, of a spring corresponding with the spring 38 of Figure 1. Now, when it is desired manually to open the valve 4', the handle or finger piece 153 is grasped and turned to turn crank 147 in a clockwise direction from the position in which the rotor is disposed in Figure 2 of the embodiment of the invention shown in Figures 1-6 to the position shown in Figure 9. In this movement of the crank, the pin 149 by engagement with the arcuate wall of the recess 151 of the rotor 119 turns the rotor from the position shown in Figure 2 to intermediate position shown in Figure 9. This movement of rotor 119 to intermediate position moves valve 4' to an intermediate flow permitting position. The movement of crank 147 to the position shown in Figure 9 causes the nib 168 to close the contact 161 into contact with the contact 162.

As the crank 147 reaches the position shown in Figure 9, the pin 149 moves beyond and becomes engaged behind the projection 166 and by such engagement holds the rotor in this position and thereby the valve in corresponding flow permitting position. Due to the engagement of pin 149 with the projection 166, it will be noted that the rotor will be turned counterclockwise slightly beyond the position shown in Figure 9 in manual operation, and will move slightly clockwise as the pin 149 moves behind the projection 166.

Now, upon resumption of electric energy or power from the source 130, the current induced in the secondary winding 131 diverts the magnetic flux through the air gap to cause turning movement of the rotor 119 from the position shown in Figure 9 to the position shown in dotted lines in Figure 2 of the preceding embodiment of the invention with accompanying movement of valve 4' to full open position. The movement of the rotor from the position shown in Figure 9 to energized position releases the pin 149 from behind the projection 166 and the manual operator returns to the released position under the bias of the spring 154. The rotor 119 and valve 4' are thus automatically returned to automatic or power control upon resumption of electric energy from the source 130 and the manual operator is returned to position for subsequent manual operation.

It will be noted that if the crank 147 is turned to the position of Figure 9 while the power is on and the thermostat 132 is calling for heat, the pin 149 will not engage the rotor 119 because said rotor is in the dotted line energized position of Figure 2. In such a case the crank 147 and pin 149 will immediately swing back to released position under the bias of the spring 154.

If, on the other hand, the crank 147 is rotated to the position of Figure 9 while the power is on and the thermostat 132 is not calling for heat, the rotor is simultaneously rotated to the position of Figure 9 and the contacts 161 and 162 are closed, causing immediate further rotation of the rotor 119 to the dotted line energized position of Figure 2. This, of course, moves the projection 166 away from the pin 149 and releases the manual operator under the bias of the spring 154. A safety feature is thus provided which prevents manual locking of the rotor 119 in open position when the power is on and also insures that the valve 4' will be operated under the control of the thermostat 132 as long as power is being supplied to the electromagnetic operator.

As in the case of the preceding embodiment of the invention, the safety shut-off mechanism 57' acting through the lever 53' closes or holds closed the valve disc 4' upon pilot failure, regardless of whether the rotor 119 is rotated either by the electromagnetic operator or by the manual operator. Thus, if the safety shut-off is released by pilot failure, the lever 53 holds the valve 4' closed, and if at such time the rotor 119 is rotated by the manual operator or by the electromagnetic operator, the lever 43' is thereby swung on the pivot 44 and the spring 52' is compressed, but no motion is imparted to the valve 4'. Thus, the safety shut-off device is effective when deenergized to overcall both the electromagnetic operator and the manual operator in holding the valve 4' closed. Inadvertent manual opening of the valve 4' is thus prevented. As has been previously mentioned herein, overheating of the electromagnetic operator is also prevented by this arrangement.

The embodiments of the invention shown in the drawings are for illustrative purposes only and it is to be expressly understood that said drawings and the accompanying specification are not to be construed as a definition of the limits or scope of the invention, reference being had to the appended claims for that purpose.

I claim:

1. Apparatus for controlling fluid flow comprising, in combination, electromagnet means for energization from a source of electric energy, armature means for said electromagnet means, a said electromagnet means and armature means being held in attracted relation when said electromagnet means is energized by said source of electric energy and each having retractive movement away from the other upon deenergization of said electromagnet means, a first flow controlling member operable from flow permitting position to flow preventing position by the retractive movement of one of said means, a second flow controlling member, and a pivoted lever coacting with the other of said means and with said second flow controlling member to operate by the retractive movement of said other means said second flow controlling member to flow preventing position and to maintain same in said position.

2. Apparatus for controlling fluid flow comprising, in combination, electromagnet means for energization from a source of electric energy, armature means for said electromagnet means, said electromagnet means and armature means being held in attracted relation when said electromagnet means is energized by said source of electric energy and each having retractive movement away from the other upon deenergization of said electromagnet means, a first flow controlling member operable from flow permitting position to flow preventing position by the retractive movement of one of said means, a second flow controlling member, a pivoted lever coacting with the other of said means and with said second flow controlling member to operate by the retractive movement of said other means said second flow controlling member to flow preventing position and to maintain same in said position, and means for cocking one of said means to attracted relation with respect to the other means and effective to close said second flow controlling means if open and to maintain said second flow controlling means closed during the cocking operation.

3. Apparatus of the class described comprising, in combination, electromagnet means for energization from a source of electric energy, armature means for said electromagnet means, said electromagnet means and armature means being held in attracted relation when said electromagnet means is energized by said source of electric energy and each having retractive movement away from the other upon deenergization of said electromagnet means, a flow controlling member operable from flow permitting position to flow preventing position by the retractive movement of one of said means, and control means including a pivoted lever actuated by the retractive movement of the other means.

4. A control device comprising in combination an electromagnetic operator having a cam actuator biased to a first position and movable by energization of said operator to a second position, a member biased to a first position and movable to a second position, said member presenting maximum resistance to movement at said first position and substantially decreased resistance to movement when in a position intermediate said first and second positions, and a force transmitting connection between said cam actuator and member for actuation of said member to its said second position by movement of said cam actuator to its said second position, said connection including a follower coacting with said cam actuator, said cam actuator being so shaped that when said cam and member are in their said first positions said follower engages said cam at a contact point affording relatively great mechanical advantage and corresponding relatively great initial force for initiating movement of said member away from its first position, said cam, after said movement of said member is initiated, being positioned for engagement by said follower at a different contact point whereby to decrease said mechanical advantage and increase the rate of movement of said member relative to that of said cam.

5. A control device comprising in combination an electromagnetic operator having an armature biased to a first position and movable by energization of said operator to a second position with maximum actuating effect being exerted on said armature when the latter is in its said first position, a member biased to a first position and movable to a second position, said member presenting maximum resistance to movement at said first position and substantially decreased resistance to movement when in a position intermediate said first and second positions, and a force transmitting connection between said armature and member for actuation of said member to its said second position by movement of said armature to its said second position, said connection including a movable cam actuator and a coacting follower, said cam actuator being so shaped that when said armature and member are in their said first positions said follower engages said cam at a contact point affording relatively great mechanical advantage, said cam shape being matched to the relatively large initial force available at said armature to provide maximum initial force for initiating movement of said member away from its first position, said cam, after said movement of said member is initiated, being positioned for engagement by said follower at a different contact point whereby to decrease said mechanical advantage and increase the rate of movement of said member relative to that of said cam.

6. A control device comprising in combination an electromagnetic operator having a cam actuator biased to a first position and movable by energization of said operator to a second position, a valve member biased to a closed position and movable to an open position, said valve member presenting maximum resistance to opening movement at said closed position and progressively decreasing resistance to opening movement as it is moved away from said open position, and a force transmitting connection between said cam actuator and valve member for actuation of said valve member to open position by movement of said cam actuator to its said second position, said connection including a follower coacting with said cam actuator, said cam actuator being so shaped that when said cam and valve member are in their said first and closed positions respectively said follower engages said cam at a contact point affording relatively great mechanical advantage and corresponding relatively great initial force for initiating opening movement of said valve member, said cam after opening movement of said valve member is initiated, being positioned for engagement by said follower at a different contact point whereby to decrease said mechanical advantage and increase the rate of movement of said valve member relative to that of said cam.

7. A control device comprising in combination an electromagnetic operator having a cam actuator biased to a first position and movable by energization of said operator to a second position, a valve disk biased to a closed position and movable to an open position, said valve disk presenting maximum resistance to opening movement at said closed position and substantially decreased resistance to opening movement when in a position intermediate said closed and open positions, and a force transmitting connection between said cam actuator and valve disk for actuation of said valve disk to open position by movement of said actuator to its said second position, said connection including a pivoted lever coacting with said cam actuator and on which said valve disk is mounted, the pivot point for said lever being positioned substantially at the edge of said valve disk to reduce the force on said lever required to open said valve disk, said cam actuator being so shaped that when said cam and valve disk are in their first and closed positions respectively, said lever engages said cam at a contact point affording relatively great mechanical advantage and corresponding relatively great initial force for initiating opening movement of said valve disk, said cam, after opening movement of said valve disk is initiated, being positioned for engagement by said lever at a different contact point whereby to decrease said mechanical advantage and increase the rate of movement of said valve disk relative to that of said cam.

8. A control device comprising in combination an electromagnetic operator having a rotatable cam actuator biased to a first position and movable by energization of said operator to a second position, a member biased to a first position and movable to a second position, said member presenting maximum resistance to movement at said first position and substantially decreased resistance to movement when in a position intermediate said first and second positions, and a force transmitting connection between said cam actuator and member for actuation of said member to its said second position by movement of said cam actuator to its said second position, said connection including a follower coacting with said cam actuator, the operative coaction between said follower and cam actuator being in a radial direction with respect to the axis of said cam actuator and enabling location of said operative coaction in any position around the axis of said cam actuator, said cam actuator being so shaped that when said cam and member are in their said first positions said follower engages said cam at a contact point affording relatively great mechanical advantage and corresponding relatively great initial force for initiating movement of said member away from its first position, said cam, after said movement of said member is initiated, being positioned for engagement by said follower at a different contact point whereby to decrease said mechanical advantage and increase the rate of movement of said member relative to that of said cam.

9. A control device comprising in combination an electromagnetic operator having a rotatable cam actuator biased to a first position and movable by energization of said operator to a second position, a valve seat coaxial with said cam actuator, a valve disk biased to a closed position with respect to a valve seat and movable to an open position, said valve disk presenting maximum resistance to opening movement at said closed position and substantially decreased resistance to movement when in a position intermediate said closed and open positions, and a force transmitting connection between said cam actuator and valve disk for actuation of said disk to open position by movement of said cam actuator to its said second position, said connection including a pivotal lever coacting with said cam actuator and on which said valve disk is mounted, the pivot point for said lever being positioned substantially at the edge of said valve disk, and the operative coaction between said lever and cam actuator being in a radial direction with respect to the axis of said cam actuator, said cam actuator being so shaped that when said cam and valve disk are in their said first and closed positions respectively said lever engages said cam at a contact point affording relatively great mechanical advantage and corresponding relatively great initial force for initiating opening movement of said valve disk, said cam, after said opening movement is initiated, being positioned for engagement by said lever at a different contact point whereby to decrease said mechanical advantage and increase the rate of movement of said valve disk relative to that of said cam.

10. A fluid flow-controlling apparatus comprising a flow-controlling member movable between flow-permitting and flow-preventing positions, manually operated actuating mechanism for normally effecting manual actuation of said flow-controlling member to flow-permitting position, and safety shut-off means coacting with said flow-controlling member for overcalling said manually operated mechanism to render the latter inoperative to effect disposition of said flow-controlling member in flow-permitting position, said safety shut-off means moving said flow-controlling member to flow-preventing position if said member is being manually held in flow-permitting position by said mechanism, and holding said member in flow-preventing position.

11. A fluid flow-controlling apparatus comprising a flow-controlling member movable between flow-permitting and flow-preventing positions, manually operated actuating mechanism, a spring loaded lost-motion force-transmitting connection between said flow-controlling member and said actuating mechanism normally permitting manual actuation of said flow-controlling member to flow-permitting position, and safety shut-off means coacting with said flow-controlling member for moving said flow-controlling member to flow-preventing position if said member is in flow-permitting position, and for holding said member in flow-preventing position with greater force than can be exerted thereon through said lost-motion connection by manual operation of said actuating mechanism, wherefore said lost-motion connection is operable to render manual operation of said actuating mechanism ineffective to cause movement of said flow-controlling member when the latter is being held in flow-preventing position by said safety shut-off means.

12. A fluid flow-controlling apparatus comprising a first flow-controlling member movable between flow-permitting and flow-preventing position, a second flow-controlling member movable between flow-permitting and flow-preventing positions, manually operated actuating mechanism for manual actuation of said first flow-controlling member to flow-permitting position, and safety shut-off means coacting with said first and second flow-controlling members and operable to overcall said manually operated mechanism and move said first flow-controlling member to flow-preventing position if said member is being manually held in flow-permitting position by said mechanism, said safety shut-off means comprising electromagnet means, and armature means, said electromagnet means and armature means being held in attracted relation when said electromagnet means is energized and at least one of said means having retractive movement away from the other on deenergization of said electromagnet means, each of said first and second flow-controlling members having operative coaction with one of said means and being operated from flow-permitting to flow-preventing position by retractive movement of the means coacting therewith.

13. A fluid flow-controlling apparatus comprising a first flow-controlling member movable between flow-permitting and flow-preventing positions, a second flow-controlling member movable between flow-permitting and flow-preventing positions, manually operated actuating mechanism, a spring loaded lost-motion force-transmitting connection between said first flow-controlling member and said mechanism normally permitting manual actuation of said first flow-controlling member to flow-permitting position, and safety shut-off means coacting with said first and second flow-controlling members for moving said flow-controlling members to flow-preventing position and for holding said members in flow-preventing position, said lost-motion connection being operable to render manual operation of said actuating mechanism ineffective to cause movement of said first flow-controlling member in a flow-permitting direction when the latter is being held in flow-preventing position by said safety shut-off means, said safety shut-off means comprising electromagnet means, and armature means, said electromagnet means and armature means being held in attracted relation when said electromagnet means is energized and at least one of said means having retractive movement away from the other on deenergization of said electromagnet means, each of said first and second flow-controlling members having operative coaction with one of said means and being operated from flow-permitting to flow-preventing position by retractive movement of the means coacting therewith.

14. Apparatus for controlling fluid flow comprising, electromagnet means for energization from a source of electric energy, armature means for said electromagnet means, said electromagnet means and armature means being held in attracted relation when said electromagnet means is energized and each having retractive moveement away from the other upon deenergization of said electromagnet means, a first flow-controlling member operable from flow-permitting position to flow-preventing position by retractive movement of one of said means, a second flow-controlling member operable from flow-permitting position to flow-preventing position by retractive movement of the other of said means, and means for cocking one of said means to attracted relation with respect to the other means and effective to move said second flow-controlling member to flow-preventing position if in flow-permitting position and to maintain said second flow-controlling member in flow-preventing position during the cocking operation.

15. A control device comprising in combination, an electromagnetic operator having an armature biased to a first position and actuatable by energization of said operator to a second position, a flow-controlling member connected to said armature and normally movable from a flow-preventing position to a flow-permitting position by movement of said armature to said second position, manually operated mechanism coacting with said armature for manual actuation thereof in the event of power failure, said manual actuation of the armature normally effecting movement of said flow-controlling member to a flow-permitting position, and safety shut-off means coacting with said flow-controlling member for overcalling said electromagnetic operator and said manually operated mechanism and moving said flow-controlling member to flow-preventing position if said member is being held in a flow-permitting position by actuation of said armature either by energization of said operator or by said manually operated mechanism, and for holding said flow-controlling member in flow-preventing position.

16. A control device comprising in combination, an electromagnetic operator having an armature biased to one position and actuatable by enregization of said operator to an actuated position, a flow-controlling member connected to said armature and normally movable from a flow-preventing position to a flow-permitting position by movement of said armature to an actuated position, manually operated mechanism coacting with said armature for manual actuation thereof in the event of power failure, releasable retention means rendered operative to retain said armature in an actuated position when manually actuated thereto on power failure and releasable by subsequent resumption of power, said manual actuation of the armature normally effecting movement of said flow-controlling member to a flow-permitting position, and safety shut-off means coacting with said flow-controlling member for overcalling said electromagnetic operator, said manually operated mechanism and said retention means and for moving said flow-controlling member to flow-preventing position if said member is being held in a flow-permitting position by actuation of said armature by said operator, said mechanism or by said retention means, and for holding said flow-controlling member in flow-preventing position.

17. A control device comprising in combination, an electromagnetic operator having an amature biased to a first position and actuatable by energization of said operator to a second position, a flow-controlling member connected to said armature and normally movable from a flow-preventing position to a first flow-permitting position by movement of said armature to said second position, manually operated mechanism coacting with said armature for manual actuation thereof to an intermediate position and for releasably retaining said armature in said intermediate position in the event of power failure, said manual actuation of the armature normally effecting movement of said flow-controlling member to an intermediate flow-permitting position, subsequent resumption of power being effective to release the armature from retention in said intermediate position and to actuate said armature to said second position and thereby to normally actuate said flow-controlling member to said first flow-permitting position, said safety shut-off means coacting with said flow-controlling member for overcalling said electromagnetic operator and mechanism and moving said flow-controlling member to flow-preventing position if said member is being held in a flow-permitting position by actuation of said armature either by energization of said operator or by said mechanism, and for holding said flow-controlling member in flow-preventing position.

18. A control device comprising in combination, an electromagnetic operator having an armature biased to one position and actuatable by energization of said operator to an actuated position, a flow-controlling member connected to said armatmure and normally movable from a flow-preventing position to a flow-permitting position by movement of said armature to an actuated position, manually operated mechanism coacting with said armature for manual actuation thereof in the event of power failure, said manual actuation of said armature normally effecting movement of said flow-controlling member to a flow-permitting position, means actuated by said manually operated mechanism in actuating said armature for completing an electrical circuit to insure energization of said operator on resumption of power after failure thereof, and safety shut-off means coacting with said flow-controlling member for overcalling said electromagnetic operator and said manually operated mechanism and moving said flow-controlling member to flow-preventing position if said member is being held in a flow-permitting position by actuation of said armature either by energization of said operator of by said manually operated mehanism, and for holding said flow-controlling member in flow-preventing position.

19. A control device comprising in combination, an electromagnetic operator having an armature biased to a first position and actuatable by enregization of said operator to a second position, a first flow-controlling member connected to said armature and normally movable from a flow-preventing position to a flow-permitting position by movement of said armature to said second position, a second flow-controlling member movable between flow-permitting and flow-preventing positions, manually operated mechanism coacting with said armature for manual actuation thereof in the event of power failure, said manual actuation of the armature normally effecting movement of said first flow-controlling member to a flow-permitting position, and safety shut-off means coacting with said first and second flow-controlling members and operable to overcall said electromagnetic operator and said manually operated mechanism and move said first flow-controlling member to flow-preventing position if said member is being held in a flow-permitting position by actuation of said armature either by energization of said operator or by said manually operated mechanism, and for holding said flow-controlling member in flow-preventing position, said safety shut-off means comprising electromagnet means, and armature means, said electromagnet and armature means being held in attracted relation when said electromagnet means is energized, and at least one of said means having retractive movement away from the other on deenergization of said electromagnet means, each of said first and second flow-controlling members having operative coaction with one of said means and being operated from flow-permitting to flow-preventing position by retractive movement of the means coacting therewith.

References Cited in the file of this patent

UNITED STATES PATENTS

| 719,768 | Engberg | Feb. 3, 1903 |
| 1,626,817 | Hammett | May 3, 1927 |
| 2,237,577 | Ray | Apr. 8, 1941 |
| 2,245,834 | Sparrow | June 17, 1941 |
| 2,275,340 | Betz | Mar. 3, 1942 |
| 2,361,945 | Jackson | Nov. 7, 1944 |
| 2,363,073 | Mantz | Nov. 21, 1944 |
| 2,476,419 | Koenig | July 19, 1949 |

UNITED STATES PATENT OFFICE
CERTIFICATE OF CORRECTION

Patent No. 2,850,031                                                  September 2, 1958

Eugene E. Meusy

It is hereby certified that error appears in the printed specification of the above numbered patent requiring correction and that the said Letters Patent should read as corrected below.

Column 2, lines 18 and 19, for "electromaget" read -- electromagnet --; column 15, line 39, for "member is" read -- member in --; line 49, for "position" read -- positions --; column 16, line 2, after "said" insert -- actuating --; lines 29 and 30, for "movemeent" read -- movement --; line 66, for "enregization" read -- energization --; column 17, line 44, for "armatmure" read -- armature --; column 18, line 12, for "enregization" read -- energization --.

Signed and sealed this 25th day of November 1958.

(SEAL)
Attest:

KARL H. AXLINE                                          ROBERT C. WATSON

Attesting Officer                                       Commissioner of Patents